US012248529B2

(12) United States Patent
Popat et al.

(10) Patent No.: US 12,248,529 B2
(45) Date of Patent: Mar. 11, 2025

(54) MULTI SOURCE EXTRACTION AND SCORING OF SHORT QUERY ANSWERS

(71) Applicant: Google LLC, Mountain View, CA (US)

(72) Inventors: Preyas Dalsukhbhai Popat, Mountain View, CA (US); Gaurav Bhaskar Gite, Zurich (CH); John Blitzer, Mountain View, CA (US); Jayant Madhavan, San Francisco, CA (US); Aliaksei Severyn, Lachen (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/000,152

(22) PCT Filed: Mar. 9, 2022

(86) PCT No.: PCT/US2022/071054
§ 371 (c)(1),
(2) Date: Nov. 29, 2022

(87) PCT Pub. No.: WO2023/172334
PCT Pub. Date: Sep. 14, 2023

(65) Prior Publication Data
US 2023/0342411 A1  Oct. 26, 2023

(51) Int. Cl.
*G06F 16/957* (2019.01)
*G06F 16/951* (2019.01)

(52) U.S. Cl.
CPC .......... *G06F 16/957* (2019.01); *G06F 16/951* (2019.01)

(58) Field of Classification Search
CPC ... G06F 16/957; G06F 16/951; G06F 16/9538
See application file for complete search history.

(56) References Cited

U.S. PATENT DOCUMENTS

| | | | |
|---|---|---|---|
| 2018/0089593 A1* | 3/2018 | Patel | G06F 30/00 |
| 2021/0406294 A1 | 12/2021 | Mansjur et al. | |
| 2022/0171873 A1* | 6/2022 | Lundbæk | G06F 16/9538 |
| 2023/0185812 A1* | 6/2023 | Hermle | G06F 16/9535 707/722 |

FOREIGN PATENT DOCUMENTS

| | | | |
|---|---|---|---|
| JP | 2002032413 A | 1/2002 | |
| JP | 2012053855 A | 3/2012 | |

OTHER PUBLICATIONS

International Search Report and Written Opinion for PCT Application No. PCT/US2022/071054, mailed on Sep. 12, 2022, 11 pages.
Office Action for Japanese Application No. 2023-502802 (with English translation), mailed May 7, 2024, 4 pages.

* cited by examiner

*Primary Examiner* — Hosain T Alam
*Assistant Examiner* — Chongsuh Park
(74) *Attorney, Agent, or Firm* — Brake Hughes Bellermann LLP

(57) ABSTRACT

Techniques of generating short answers for queries by a search engine include performing a training operation on a corpus of training data to train the score prediction engine, the corpus of training data including candidate passages providing short answers for display in callouts and remaining respective passages, from which a top scoring short answer is generated. In such implementations, the corpus of training data further includes the remaining respective passages and the respective titles of the candidate passage and remaining respective passages.

20 Claims, 8 Drawing Sheets

MULTI SOURCE EXTRACTION AND SCORING OF SHORT QUERY ANSWERS

TECHNICAL FIELD

This description relates to generating short answers for display in a browser running a search engine.

BACKGROUND

Some search engines support short answers displayed in a callout, which is displayed at a prominent position within a search browser window displaying results of a search engine. Such a prominent display of short answers provides a user with very fast answer to factual queries without the user having to select a search result and click on it before obtaining an answer to the query. Moreover, the search engine is enabled to directly provide answers to a diverse range of questions without a curated knowledge base.

SUMMARY

Implementations described herein are related to generating short answers for display based on multiple passages resulting from a query provided to a search engine. A short answer is an answer to a factual query prominently displayed in a browser window running a search engine; such an answer may be derived from—or is—a passage in a top-ranked search result. Short answers are only as good as the passage from which they are derived; accordingly, using other passages for context when deriving a short answer from a passage should improve the quality of the short answer. The determination of whether to display a particular short answer depends on an accuracy score provided by an accuracy score prediction engine; the short answer is displayed or not displayed based on whether the accuracy score is greater than or less than an accuracy score threshold, respectively. The accuracy score may be determined by an accuracy score prediction engine that predicts an accuracy score for a passage from a top-ranked search result based on a consensus with other passages from other search results. The accuracy score prediction engine is trained using passages from search engine results, manually scored by raters based on consensus with context passages from other search results.

In one general aspect, a computer-based method can include receiving query data representing a search query input by a user into a search engine. The method can also include generating a plurality of search results based on the search query, each of the plurality of search results having a respective passage relating to the search query. The method can further include selecting a set of the respective passages, one of the respective passages in the set being a candidate passage belonging to a top-ranked search result of the plurality of search results and remaining respective passages in the set being context passages. The method can further include scoring the candidate passage using the context passages to produce an accuracy score for the candidate passage. The method can further include providing, based on the accuracy score, the candidate passage for display as a short answer in a search result page rendered by a browser window on a display.

In another general aspect, a computer program product comprises a non-transitory storage medium, the computer program product including code that, when executed by processing circuitry of a computing device, causes the processing circuitry to perform a method. The method can include receiving query data representing a search query input by a user into a search engine. The method can also include generating a plurality of search results based on the search query, each of the plurality of search results having a respective passage relating to the search query. The method can further include selecting a set of the respective passages, one of the respective passages in the set being a candidate passage belonging to a top-ranked search result of the plurality of search results and remaining respective passages in the set being context passages. The method can further include scoring the candidate passage using the context passages to produce an accuracy score for the candidate passage. The method can further include providing, based on the accuracy score, the candidate passage for display as a short answer in a search result page rendered by a browser window on a display.

In another general aspect, an electronic apparatus comprises memory and controlling circuitry coupled to the memory. The controlling circuitry can be configured to receive query data representing a search query input by a user into a search engine. The controlling circuitry can also be configured to generate a plurality of search results based on the search query, each of the plurality of search results having a respective passage relating to the search query. The controlling circuitry can further be configured to select a set of the respective passages, one of the respective passages in the set being a candidate passage belonging to a top-ranked search result of the plurality of search results and remaining respective passages in the set being context passages. The controlling circuitry can further be configured to score the candidate passage using the context passages to produce an accuracy score for the candidate passage. The controlling circuitry can further be configured to provide, based on the accuracy score, the candidate passage for display as a short answer in a search result page rendered by a browser window on a display.

The details of one or more implementations are set forth in the accompanying drawings and the description below. Other features will be apparent from the description and drawings, and from the claims.

DETAILED DESCRIPTION

Figure 1A:
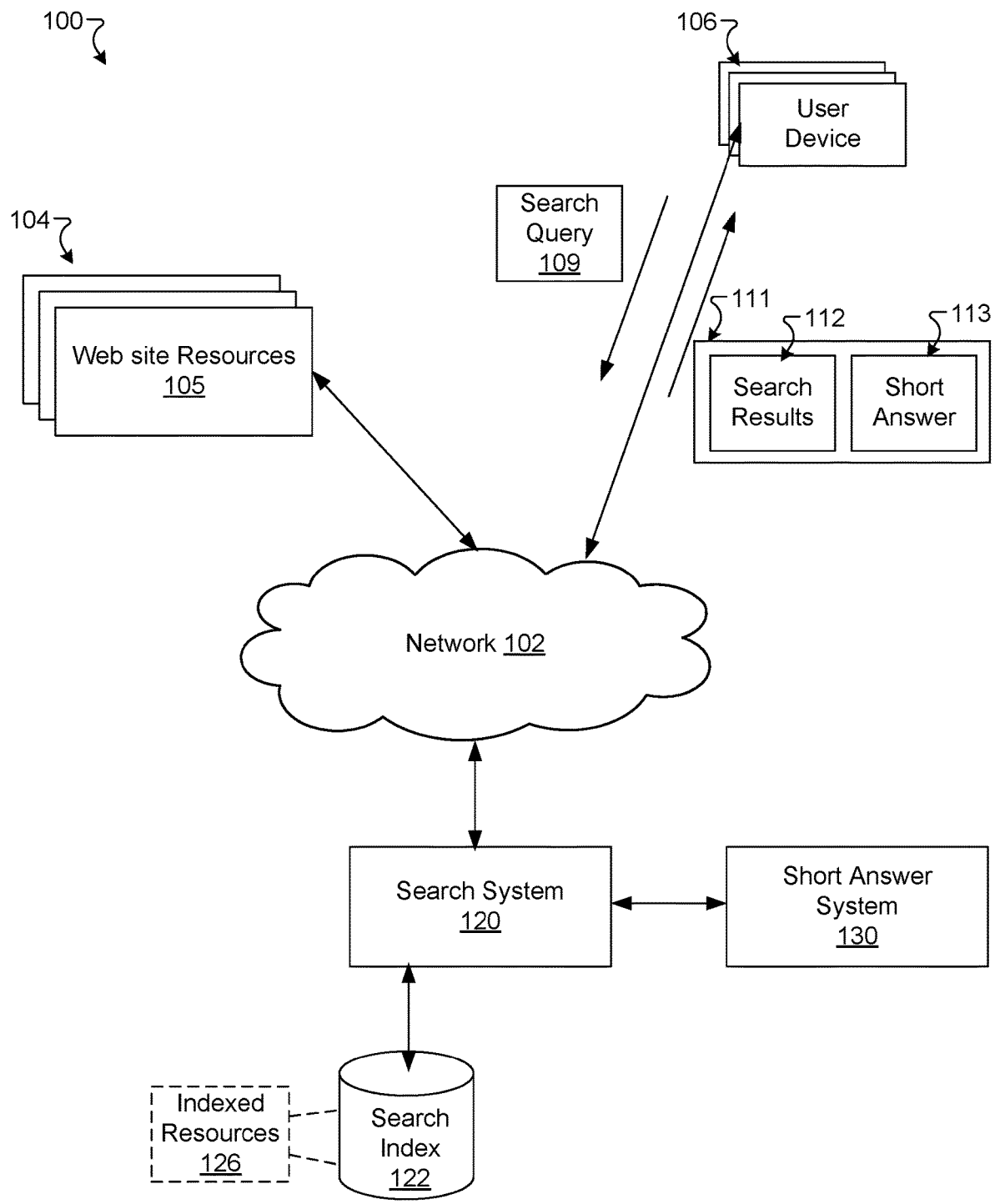
FIG. 1A is a diagram that illustrates an example search engine in which improved techniques described herein may be implemented.

Some search engines support short answers displayed in a prominent position within a search browser window displaying results of a search engine. The short answers include a passage or extraction from a passage that represents an answer to a factual query. Such a prominent display of short answers provides a user with a very fast answer to a query without the user having to select a search result and click on it before obtaining an answer to the query. Moreover, the search engine is enabled to directly provide answers to a diverse range of questions without a curated knowledge base. But selecting the passages for the short answer can be complex and prone to errors.

For example, in response to a query from a user, "What does NFC stand for in sports," a search engine may display a short answer in a position of prominence on the user's display. In this case, the user expects to see "National Football Conference", prominently displayed in the search engine browser window on the user's display. However, the answer "Near Field Communication" may be displayed instead.

Conventional search engines that support short answers, sometimes displayed in callouts, obtain each short answer separately from a respective search result. The search result chosen for the short answer for a given query may represent a web site and include a link to the web site displayed in the search results from which the short answer is taken. The selection of the short answer by the search engine involves taking passages from a web site for the top-ranked search result and selecting a passage (span of text) that determined to be most likely to include the answer to the query.

A technical problem with the above-described conventional approaches to generating short answers is that short answers in the above-described conventional search engines may be of varying quality, depending on the selected search results. In such approaches, the logic used to select a passage from which a short answer is taken does not account for the quality of the short answer. Thus, in some cases, the short answer may be misleading or even wrong.

In accordance with the implementations described herein, a technical solution to the above-described technical problem includes an improved scoring engine (accuracy score prediction engine) for determining whether to display a short answer. The improved scoring engine uses multiple passages from multiple different respective search results. The determination of whether to display a particular short answer depends on an accuracy score provided by an accuracy score prediction engine; the short answer is displayed or not displayed based on whether the accuracy score is greater than or less than an accuracy score threshold, respectively. The accuracy score may be determined by an accuracy score prediction engine that predicts an accuracy score for a passage from a top-ranked search result based on a consensus with other passages from other search results. The accuracy score prediction engine is trained using passages from search engine results, manually scored by raters based on consensus with context passages from other search results.

A technical advantage of disclosed implementations is that, in contrast to the conventional search engines, the short answer provided by the above-described improved search engine is of higher quality (e.g., more likely to be correct) because the search engine determines a degree of consensus between the multiple passages from different sources. Moreover, an improved quality of short answers can result in fewer user queries and accordingly reduced network data.

FIG. 1A depicts an example environment 100 in which users can interact with one or more computer-implemented search services. Example computer-implemented search services can include a search service for an electronic mail service, a chat service, a document sharing service, a calendar sharing service, a photo sharing service, a video sharing service, a shopping service, a blogging service, a micro-blogging service, a social networking service, a location (location-aware) service, a check-in service and/or a ratings and review service. In the example of FIG. 1A, an Internet search service is depicted, which is discussed in further detail herein. It is appreciated, however, that implementations of the present disclosure can include one or more computer-implemented services, such as the examples discussed herein.

With continued reference to FIG. 1A, a search system 120 provides search services. The example environment 100 includes a network 102, e.g., a local area network (LAN), wide area network (WAN), the Internet, or a combination thereof, connects web sites 104, user devices 106, and the search system 120. In some examples, the network 102 can be accessed over a wired and/or a wireless communications link. For example, mobile computing devices, such as smartphones can utilize a cellular network to access the network. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site. Web site resources 105 can be static or dynamic.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is under control of a user and is capable of requesting and receiving resources 105 over the network 102. Example user devices 106 include personal computers, mobile computing devices, e.g., smartphones, wearable devices, and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device, as are wearables and other smart devices such as smart speakers. A user device 106 typically includes a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122, e.g., as indexed resources 126.

The user devices 106 submit search queries 109 to the search system 120. In some examples, a user device 106 can include one or more input modalities. Example modalities can include a keyboard, a touchscreen, and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105 and short answer 113, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., JavaScript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In accordance with implementations of the present disclosure, the example environment 100 also includes short answer system 130 communicably coupled to the search system 120, e.g., directly coupled or coupled over a network such as network 102. In some examples, and in the case of multiple computer-implemented services, the short answer system 130 is communicably coupled to respective systems that provide functionality of the respective computer-implemented services. In some examples, the systems, e.g., the search system 120, can interact with the short answer system 130 to provide accurate short answers 113 in a position of prominence, sometimes displayed in a callout, in a browser window running the search system 120, as discussed in further detail herein.

Figure 1B:
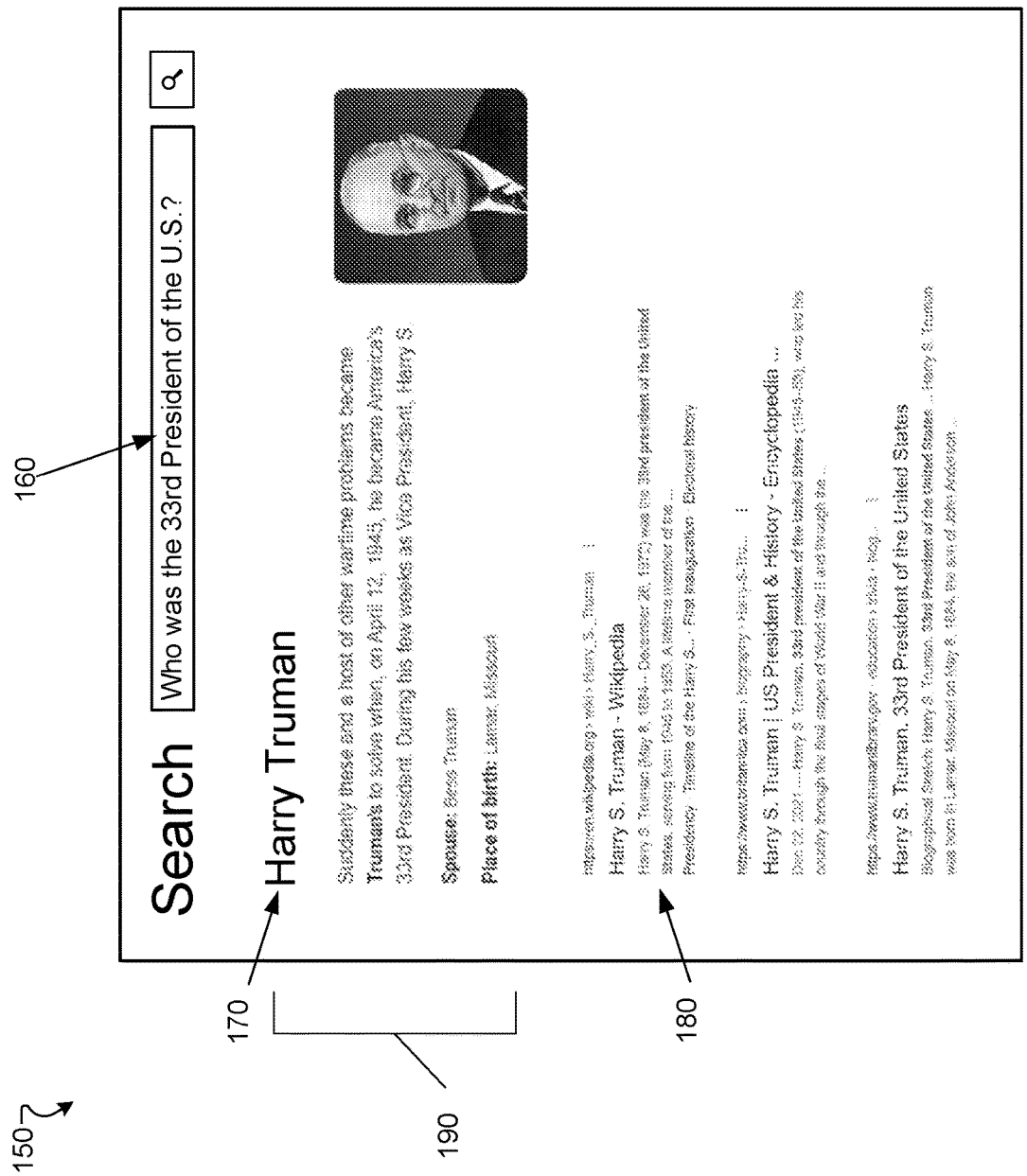
FIG. 1B is a diagram that illustrates an example short answer displayed in a browser window on a display, resulting from a search query.

FIG. 1B is a diagram that illustrates a user interface 150 in which an example short answer 190 appears. In the example of FIG. 1B, the short answer 190 includes an extracted answer 170. The extracted answer 170 is extracted from the short answer 190. The short answer 190 is displayed in a browser window on a display, resulting from a search query 160. In this case, the short answer 190 is based on a passage from a top-ranked search result 180. It is noted that the short answer 190 (and more specifically the extracted answer 170) correctly answers the question. In some implementations, the short answer 190 may be displayed without the extracted answer 170.

The conventional search engines display short answer 190 based on the search result 180; frequently, this can result in an inaccurate short answer as the passage that becomes the short answer is taken from the top-ranked search result and is not checked for accuracy. The above-described technical solution in this case would involve generating an accuracy score based not only on the passage but other passages taken from other search results. Accordingly, if the passage which would become the short answer does not sufficiently agree with the information in the other passages, the short answer 190 is not displayed.

Figure 2:
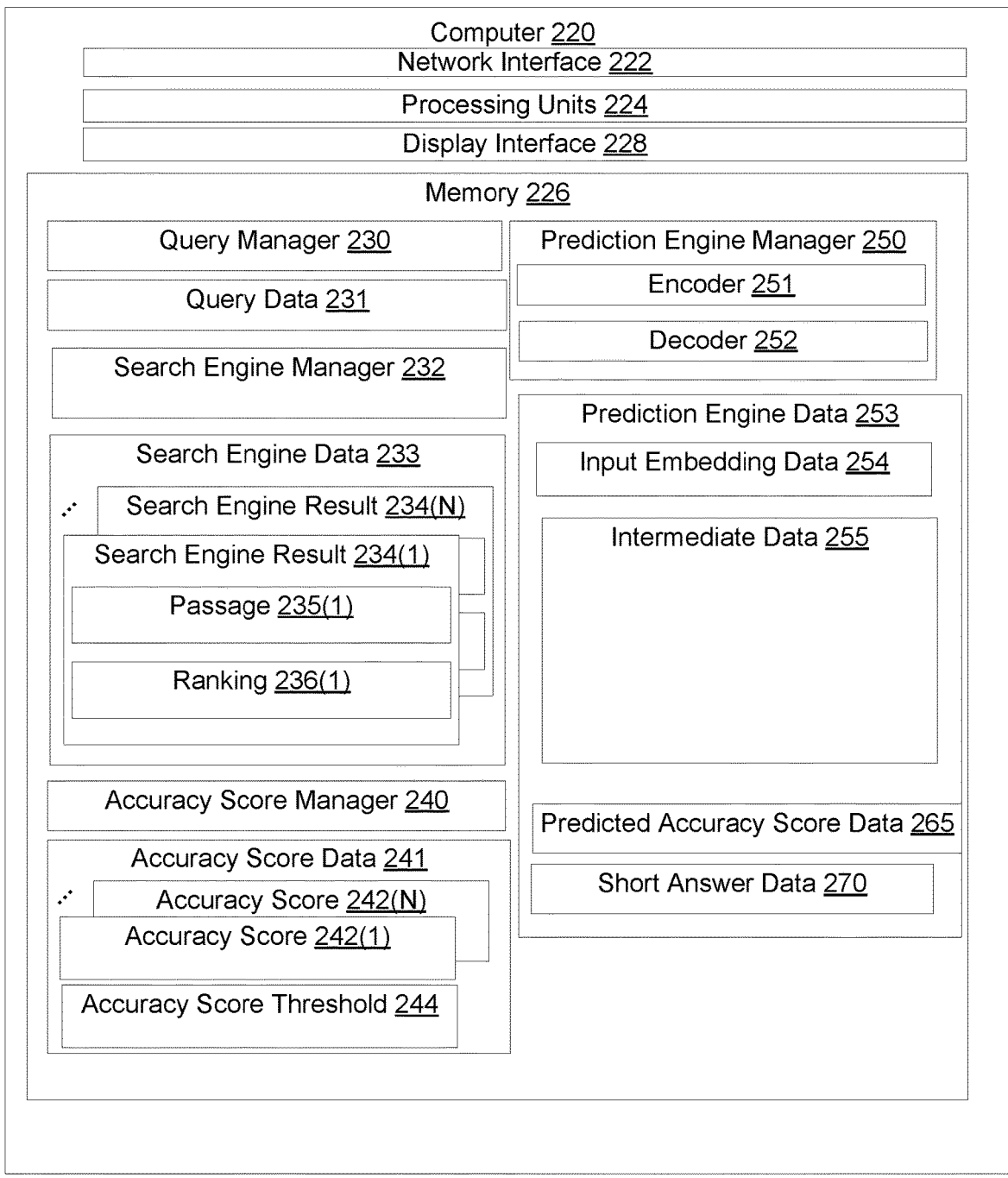
FIG. 2 is a diagram that illustrates an example electronic environment in which the improved techniques described herein may be implemented.

FIG. 2 is a diagram that illustrates an example electronic environment 200 in which the above-described technical solution may be implemented. The computer 220 is configured to generate short answers using an accuracy score prediction engine and to train the accuracy score prediction engine using a corpus of training data.

The computer 220 includes a network interface 222, one or more processing units 224, memory 226, and a display interface 228. The network interface 222 includes, for example, Ethernet adaptors, Token Ring adaptors, and the like, for converting electronic and/or optical signals received from the network to electronic form for use by the computer 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form controlling circuitry, which is configured and arranged to carry out various methods and functions as described herein. The display interface 228 is configured to provide data to a display device for rendering and display to a user.

In some implementations, one or more of the components of the computer 220 can be, or can include processors (e.g., processing units 224) configured to process instructions stored in the memory 226. Examples of such instructions as depicted in FIG. 2 include a query manager 230, a search engine manager 232, an accuracy score manager 240, and a prediction engine manager 250. Further, as illustrated in FIG. 2, the memory 226 is configured to store various data, which is described with respect to the respective managers that use such data.

The query manager 230 is configured to receive query data 231. In some implementations, the query manager 230 receives the query data 231 over the network interface 222, i.e., over a network. In some implementations, the query manager 230 receives the query data 231 directly as user input.

The query data 231 represents a query input into a search engine (e.g., search system 120 in FIG. 1A). In some implementations, the query data 231 takes the form of a string of characters. In some implementations, the query data 231 takes an alternative form, e.g., a graphic, an image, an audio clip, a video, etc.

The search engine manager 232 is configured to process the query data 231 for input into a search engine (e.g., search system 120 in FIG. 1A) to produce search engine data 233. The search engine data 233 includes a set of search engine results 234(1), . . . , 234(N). Each of the search engine results 234(1), . . . , 234(N) includes a link to a web site that includes respective passages 235(1), ..., 235(N) and a respective ranking 236(1), ..., 236(N).

Each passage, e.g., passage 235(1), is at least a portion of the content on the web site to which the search result 234(1) is linked. In the examples described herein, each of the passages 235(1), ..., 235(N) includes text. In some implementations, the text forms a paragraph. In some implementations, there is a specified amount of text, e.g., a specified number of words, sentences, or other measures of the amount of information in a passage, e.g., passage 235(1). In some implementations, however, at least one of the passages 235(1), ..., 235(N), e.g., passage 235(1), includes a graphic such as an emoji, a portion of an image, an audio clip, a video clip, or the like.

The respective rankings 236(1), ..., 236(N) of the search results 234(1), ..., 234(N) represent an arrangement of the search results as displayed in the browser window displayed on a display, e.g., via display interface 228. In some implementations, the respective rankings 236(1), ..., 236(N) take the form of numbers of a sequence. In this way, the top-ranked search result would be 234(1) and the bottom-ranked search result is 234(N).

The accuracy score manager 240 is configured to receive accuracy score data 241 from human raters as training data for a prediction engine configured to predict an accuracy score of a passage of the top-rated search result 234(1). As shown in FIG. 2, the accuracy score data 241 received from the human raters includes respective accuracy scores 242(1), ..., 242(N) for each passage 235(1), ..., 235(N). In some implementations, the human raters provide accuracy scores for only the M top-ranked passages 235(1), ..., 235(M), M<N. In some implementations, only the top-ranked passage 235(1) is provided an accuracy score.

In some implementations, the accuracy score of the top-ranked passage 235(1) is based on the accuracy of the passage 235(1) as understood by a human rater in context of a set of other passages, e.g., 235(2), ..., 235(K). In some implementations, K=1 or 2. In some implementations, there are multiple top-ranked passages, each with an accuracy score.

For example, in response to the query data 231 "how long can fish last in the freezer," the search engine returns as a top-rated passage 235(1), "when vacuum-sealed and properly stored in the freezer, fish can last for as long as two years. If frozen fish is properly thawed, there should be little to no difference in texture when compared to fresh fish." In some implementations, the short answer based on the passage 235(1) may then include "two years." displayed in a position of prominence. In some implementations, the short answer may be the passage 235(1). Without further context, the accuracy score 242(1) provided by the human rater depends solely on the passage 235(1) and the rater's personal knowledge of the subject, which may be lacking.

In the improved search engine, however, the accuracy score manager 240 provides the rater with an opportunity to examine other passages for context in order to provide a more correct accuracy score 242(1) for the passage 235(1) that is less dependent on the personal knowledge of the rater. For example, the passage 235(2) may state "Any frozen fish or shellfish will be safe indefinitely; however, the flavor and texture will lessen after lengthy storage. For best quality, freeze (0 F/−17.8 C or less) cooked fish for up to 3 months. Frozen raw fish is best used within 3 to 8 months; shellfish, 3 to 12 months." If the passage 235(2) is used for context, then the rater may provide a low accuracy score 242(1) to the short answer "two years" because the passage 235(2) has clear differences with the passage 235(1). If the short answer were derived from the passage 235(2), the rater may have provided "3 to 8 months" rather than "two years." In this case, a prediction engine manager trained using the accuracy score may result in the short answer not being displayed.

In some implementations, the accuracy score manager 240 provides the rater with more than one passage for context. For example, in addition to passages 235(1) and 235(2), the passage 235(3) may state "Fatty fish like salmon can be frozen for two to three months, while lean fish like cod or flounder will last up to six. Cooked leftovers: three months. Ground meat (beef, lamb, pork) keeps for two to three months; roasts, steaks, and chops can be kept in the freezer for at least half a year." If the passage 235(3) is provided for context in addition to passage 235(2), then the rater may provide an even lower accuracy score 242(1) to the short answer "two years" because the passage 235(3) also has clear differences with the passage 235(1). In this case, however, had either of the passages 235(2) or 235(3) been selected as the top-rated passage from which the short answer is derived, the accuracy score 242(1) for that passage may be increased over that for passage 235(1) because there is a degree of agreement between passages 235(2) and 235(3).

In some implementations, when there is more than one top-ranked passage, the accuracy score manager 240 selects the top-ranked passage with the highest accuracy score.

In some implementations, the decision regarding whether a short answer is displayed or not is based on whether the accuracy score 242(1) is greater than or less than a specified accuracy score threshold 244. In some implementations, the accuracy scores provided by raters is between −1.0 and 3.0 in steps of 0.5, with a −1.0 indicating a short answer that is demonstrably wrong in context of other passages (or in the personal knowledge of the rater) and a 3.0 indicating a short answer in complete agreement in context with other passages. In this case, the prediction engine manager 250 may be trained to output a score between −1.0 and 3.0 and the search system may use an accuracy score threshold 244 of 0.5; that is, short answers with a rating of −1.0, −0.5, and 0.0 may not be displayed, while short answers having an accuracy score of 0.5, 1.0, 1.5, 2.0, 2.5, or 2.0 may be displayed.

In some implementations, there are multiple accuracy score thresholds corresponding to different levels of short answer precision. For example, the accuracy score threshold 244 of 0.5 described above may be considered a low threshold ("good answer precision (GAP)"). Other thresholds may be defined at, e.g., 1.5 ("very good answer precision (VGAP)") or at 2.0 ("extremely good answer precision (XGAP)").

In some implementations, to generate training data for the accuracy score prediction engine, human raters are provided a dataset of examples (e.g., primary passages) to score based on a level of accuracy derived from the rater's knowledge as well as additional context passages. The primary passages are selected as responsive to a query and include a short answer the rater is asked to score as a bad answer, a good answer, very good answer, etc. In some implementations, the examples are chosen based on specified criteria, e.g., "difficult to rate without additional research," "random traffic examples," etc. In some implementations, trivial examples such as "1+1 is equal to what number?" were excluded. In some implementations, among such examples, a large percentage of the examples, e.g., 95%, may satisfy the GAP threshold, while a smaller percentage, e.g., 85% may satisfy the VGAP threshold.

To provide these examples and the scoring results to an accuracy score prediction engine, in some implementations a template on which the raters provide accuracy scores may itself be evaluated. In some implementations, the evaluation takes the form of a VGAP precision and VGAP recall. (Precision is a ratio of the number of true positive results to the total number of true and false positives; recall is a ratio of the number of true positive results to the total number of true positives and false negatives.) For example, a VGAP precision for some datasets of about 50% implies a significant number of false positives, while a VGAP of about 95% implies a smaller number of false negatives in such examples In some implementations, the template on which the raters provide accuracy scores may be adjusted to increase VGAP precision. For example, a baseline template may not use titles or URLs of search results 234(1), . . . , 234(N). In some implementations, some or all of the following changes may be made to the templates to increase VGAP precision:
  Add two additional passages that are top passages from different search results. The other passages themselves provide answers at, at least the GAP threshold.
  Raters are given more time provide an accuracy score.
  Raters are requested/required to provide comments and the result titles are shown.
  Randomize the order of the passages (e.g., so that the primary passage is not necessarily listed first).
  Add a bias term (e.g., of −0.5) to the accuracy scores.

In some implementations, VGAP recall decreases as a result of the above actions taken to increase the VGAP precision. Empirically, adding a bias term is seen to have the greatest negative effect on recall and the greatest positive effect on precision.

The prediction engine manager 250 is configured to generate accuracy score predictions based on prediction engine data 253 provided by the raters, to produce predicted accuracy score data 265 and, in some implementations, short answer data 270. As shown in FIG. 2, the prediction engine manager 250 includes an encoder 251 and a decoder 252.

The encoder 251 is configured to encode input into the prediction engine to a form appropriate for input into a machine learning engine such as a neural network. For example, in some implementations the inputs into the accuracy score prediction engine include a query (e.g., query data 231), a top-rated passage (e.g., passage 235(1)), a title of the top-rated passage, and additional passages. In some implementations, the inputs may include additional titles (e.g., corresponding to the additional passages). The additional passages are referred to as context passages. The encoder 251 is configured to convert these inputs into an input token embedding vector. The decoder 252 is configured to decode an output layer of the accuracy score prediction engine to produce predicted accuracy scores. The actions of the encoder 251 and decoder 252 are shown in FIG. 4.

Figure 4:
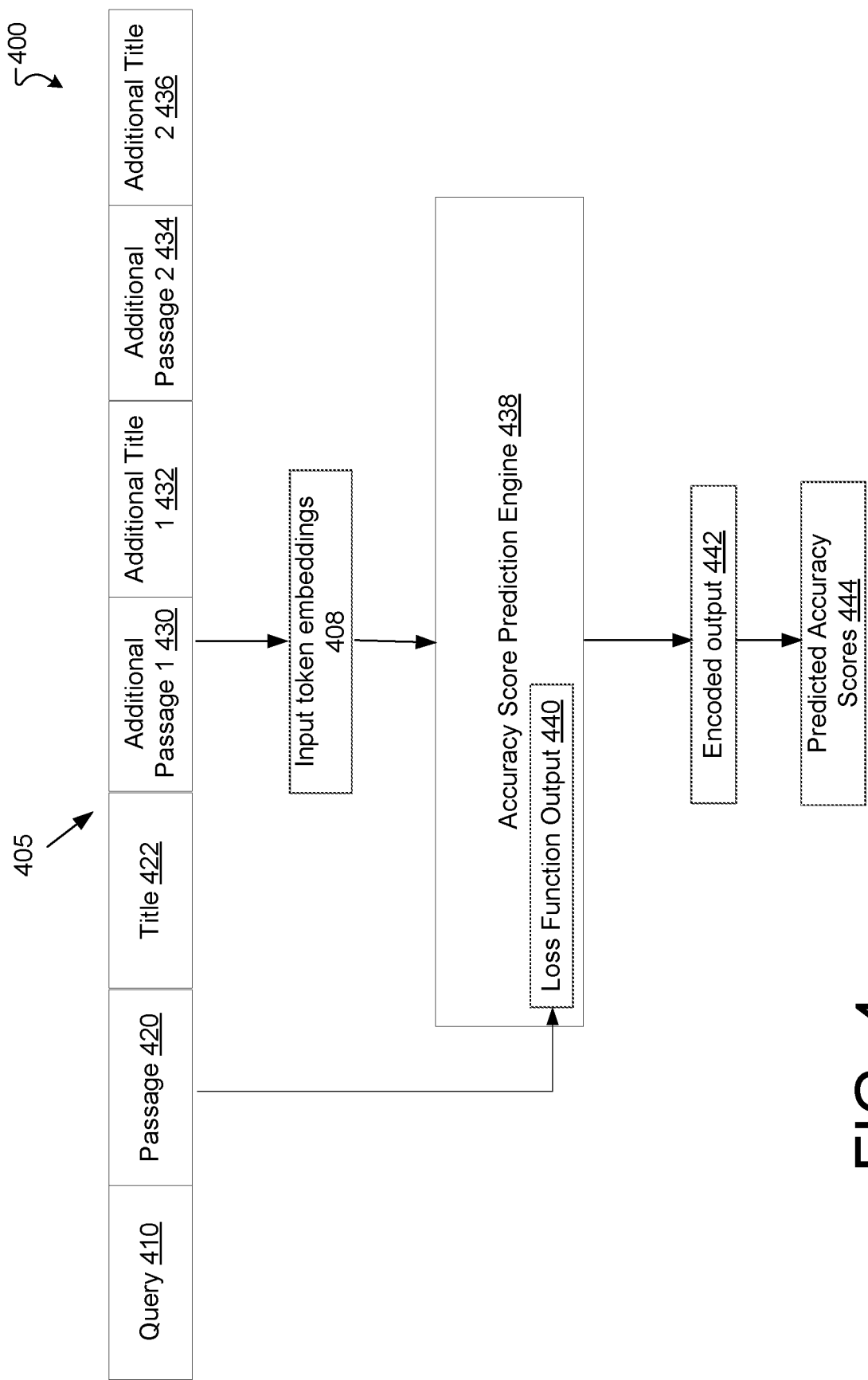
FIG. 4 is a diagram that illustrates an example input and output from an accuracy score prediction engine.

FIG. 4 is a diagram 400 that illustrates an example input 405 and output 442 from an accuracy score prediction engine. As shown in FIG. 4, an input takes the form of a query 410, a top-ranked passage 420, a corresponding title 422, additional passages 430 and 434 and their respective titles 432 and 436. The encoder 251 (FIG. 2) encodes the input to produce input token embeddings 408; these token embeddings 408 are input into an input layer of a neural network from which the accuracy score prediction engine 438 is generated. Once a training cycle is completed, the accuracy score prediction engine 438 decodes encoded output 442 to produce predicted accuracy scores 444. During training, however, the neural network produces output 440 of a loss function that is based on only the top-ranked passage 420.

Returning to FIG. 2, prediction engine data 253 represents data used to train the accuracy score prediction engine. As shown in FIG. 2, the prediction engine data 253 includes input embedding data 254, and intermediate data 255. In some implementations, the accuracy score prediction engine as shown in FIG. 2 employs a teacher-student model from Knowledge Distillation (KD). The main idea of KD is including two network structures, which are named teacher and student. The teacher is a model with a strong capability, while the student can be a simple model. The teacher model is used to teach the student model by transferring significant knowledge to the student.

The intermediate data 255 represents data used by the accuracy score prediction engine during its training. As shown in FIG. 2, the intermediate data 255 includes any of loss function output, hidden layer values, and intermediate score predictions that are fed between teacher and student models. In some implementations, the teacher and student models each have multiple stages such that the output of one stage is input into the next stage. In some implementations, the teacher model has four stages and the student model has two stages.

The predicted accuracy score data 265 represents output of the accuracy score prediction engine. In some implementations, the predicted accuracy score data 265 is used to determine whether a short answer is displayed.

The short answer data 270 represents a short answer that may or may not be displayed.

The components (e.g., modules, processing units 224) of the user device 106 can be configured to operate based on one or more platforms (e.g., one or more similar or different platforms) that can include one or more types of hardware, software, firmware, operating systems, runtime libraries, and/or so forth. In some implementations, the components of the computer 220 can be configured to operate within a cluster of devices (e.g., a server farm). In such an implementation, the functionality and processing of the components of the computer 220 can be distributed to several devices of the cluster of devices.

The components of the computer 220 can be, or can include, any type of hardware and/or software configured to process attributes. In some implementations, one or more portions of the components shown in the components of the computer 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 220 can be, or can include, a software module configured for execution by at least one processor (not shown). In some implementations, the functionality of the components can be included in different modules and/or different components than those shown in FIG. 2, including combining functionality illustrated as two components into a single component.

Although not shown, in some implementations, the components of the computer 220 (or portions thereof) can be configured to operate within, for example, a data center (e.g., a cloud computing environment), a computer system, one or more server/host devices, and/or so forth. In some implementations, the components of the computer 220 (or portions thereof) can be configured to operate within a network. Thus, the components of the computer 220 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system 120 can be, or can include, processors configured to process instructions stored in a memory. For example, query manager 230 (and/or a portion thereof), a search engine manager 232 (and/or a portion thereof), an accuracy score manager 240 (and/or a portion thereof), and a prediction engine manager 250 (and/or a portion thereof).

In some implementations, the memory 226 can be any type of memory such as a random-access memory, a disk drive memory, flash memory, and/or so forth. In some implementations, the memory 226 can be implemented as more than one memory component (e.g., more than one RAM component or disk drive memory) associated with the components of the computer 220. In some implementations, the memory 226 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the computer 220. As illustrated in FIG. 2, the memory 226 is configured to store various data, including query data 231, search engine data 233, accuracy score data 241, prediction engine data 253, predicted accuracy score data 265, and short answer data 270.

Figure 3:
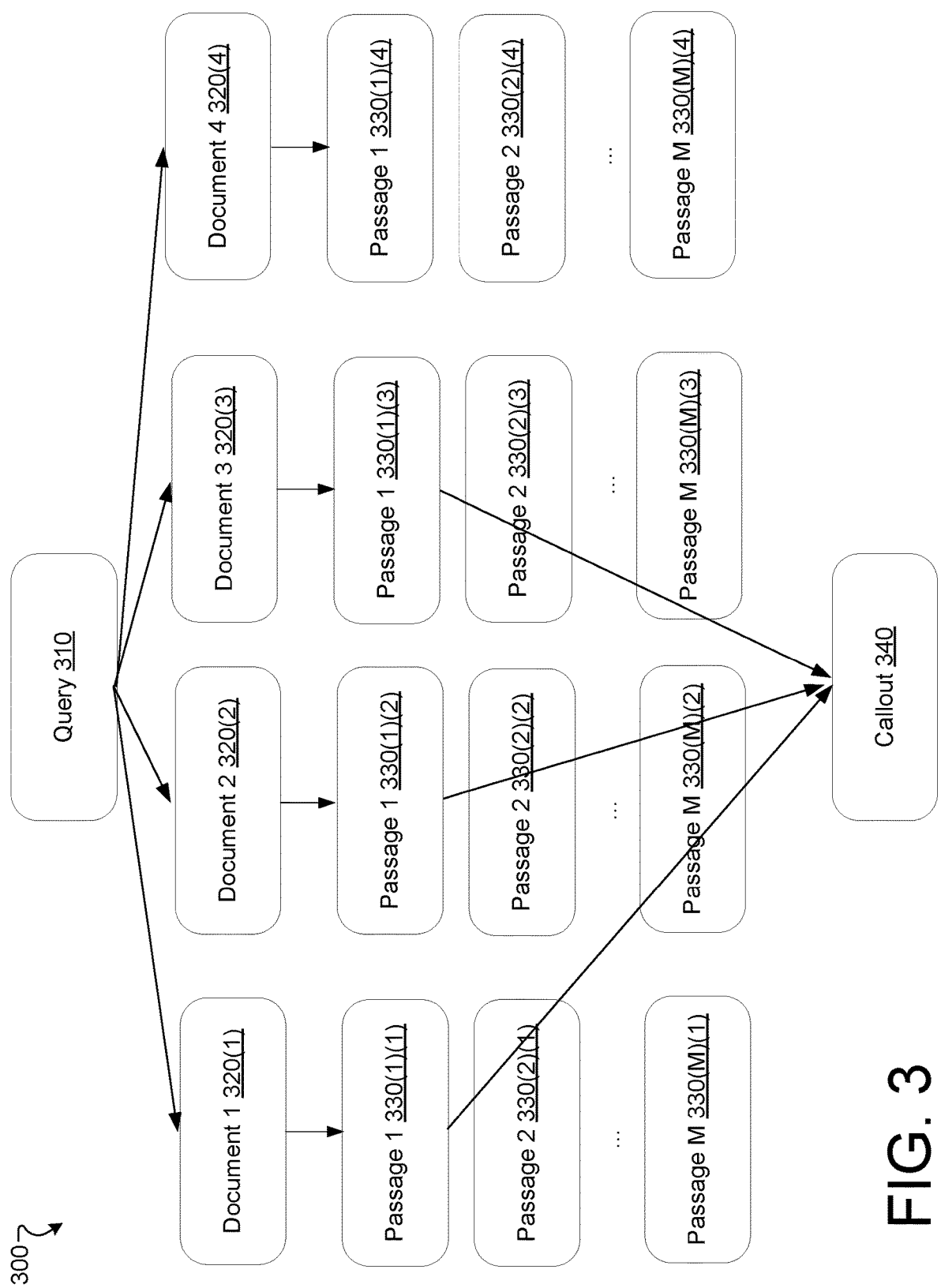
FIG. 3 is a diagram that illustrates example flow of data from multiple, top-scoring passages from search results into a callout.

FIG. 3 is a diagram that illustrates example flow of data 300 from multiple, top-scoring passages from search results into a callout. As shown in FIG. 3, a query 310 input into a search engine produces search results in the form of documents 320(1-4). As shown in FIG. 3, each of the documents 320(1-4) has M passages (although some may have fewer) 330(1-4)(1-M). The passages 330(1)(1), 330(1)(2), and 330(1,3) are input into the accuracy score prediction engine to produce callout 340.

Figure 5:
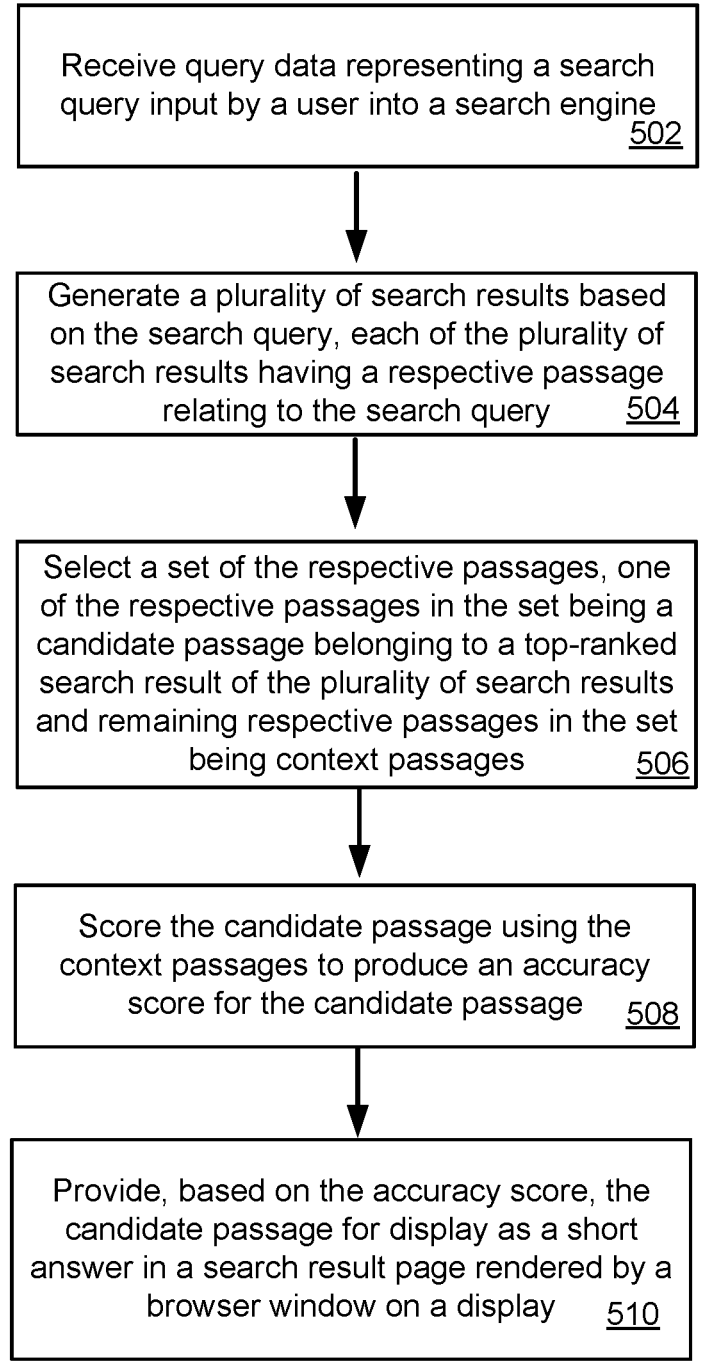
FIG. 5 is a flow chart that illustrates an example method of performing consensus-based short answer presentation, according to disclosed implementations.

FIG. 5 is a flow chart depicting an example method 500 of generating short answers for display based on multiple passages resulting from a query provided to a search engine according to the above-described improved techniques. The method 500 may be performed by software constructs described in connection with FIG. 2, which reside in memory 226 of the computer 220 and are run by the set of processing units 224.

At 502, the query manager 230 receives query data (e.g., query data 231) representing a search query input by a user into a search engine.

At 504, the search engine manager 232 generates a plurality of search results (e.g., search results 234(1-N)) based on the search query, each of the plurality of search results having a respective passage (e.g., passages 235(1-N)) relating to the search query. The respective passages may be selected using conventional methods.

At 506, the prediction engine manager 250 selects a set of the respective passages for short answer scoring, one of the respective passages in the set being a candidate passage belonging to a top-ranked search result of the plurality of search results and remaining respective passages in the set being context passages. In some implementations, the set includes a predetermined number of passages, e.g., from a predetermined number of top-ranked search results. In some implementations, the set includes three passages including the passage from the top-ranked search result.

At 508, the prediction engine manager 250 scores the candidate passage using the context passages to produce an accuracy score for the candidate passage. In addition to the context passages, the prediction engine manager 250 may also include the search query (or a portion thereof) and a title corresponding to the candidate passage as input. In some implementations, the prediction engine manager 250 may also include titles corresponding to the context passages as input.

At 510, the prediction engine manager 250 provides, based on the accuracy score satisfying a threshold, the candidate passage for display as a short answer in a search result page rendered by a browser window on a display.

Figure 6:
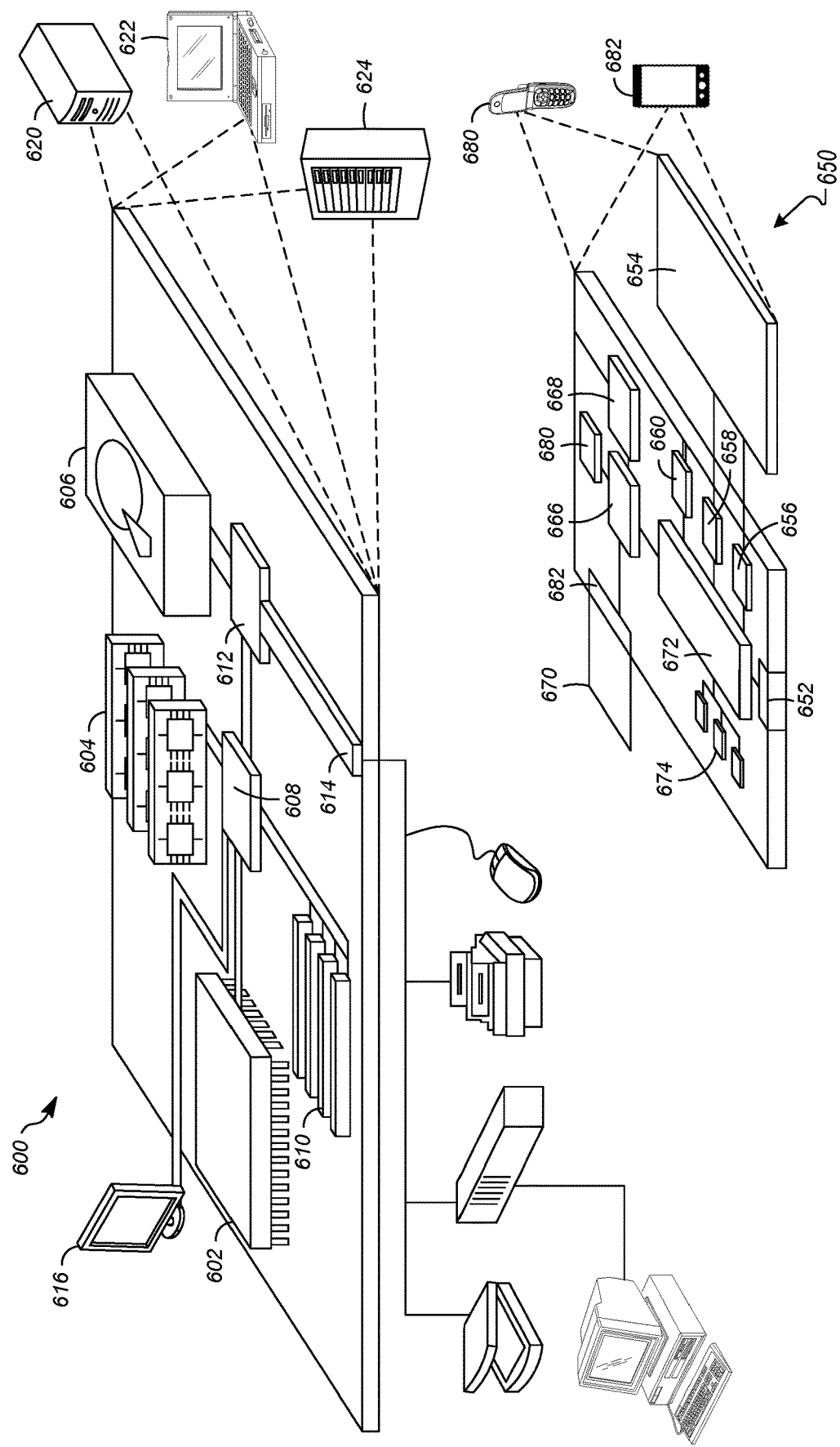
FIG. 6 is a diagram that illustrates an example of a computer device and a mobile computer device that can be used to implement the described techniques.

FIG. 6 illustrates an example of a generic computer device 600 and a generic mobile computer device 650, which may be used with the techniques described here. Computer device 600 is one example configuration of search system 120 and/or short answer system 130 of FIG. 1A and computer 220 of FIG. 2.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions are examples only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 660 may be provided in communication with processor 652, so as to enable near area communication of device 650 with other devices. External interface 660 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory 674, or memory on processor 652, that may be received, for example, over transceiver 668 or external interface 660.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Figure 7:
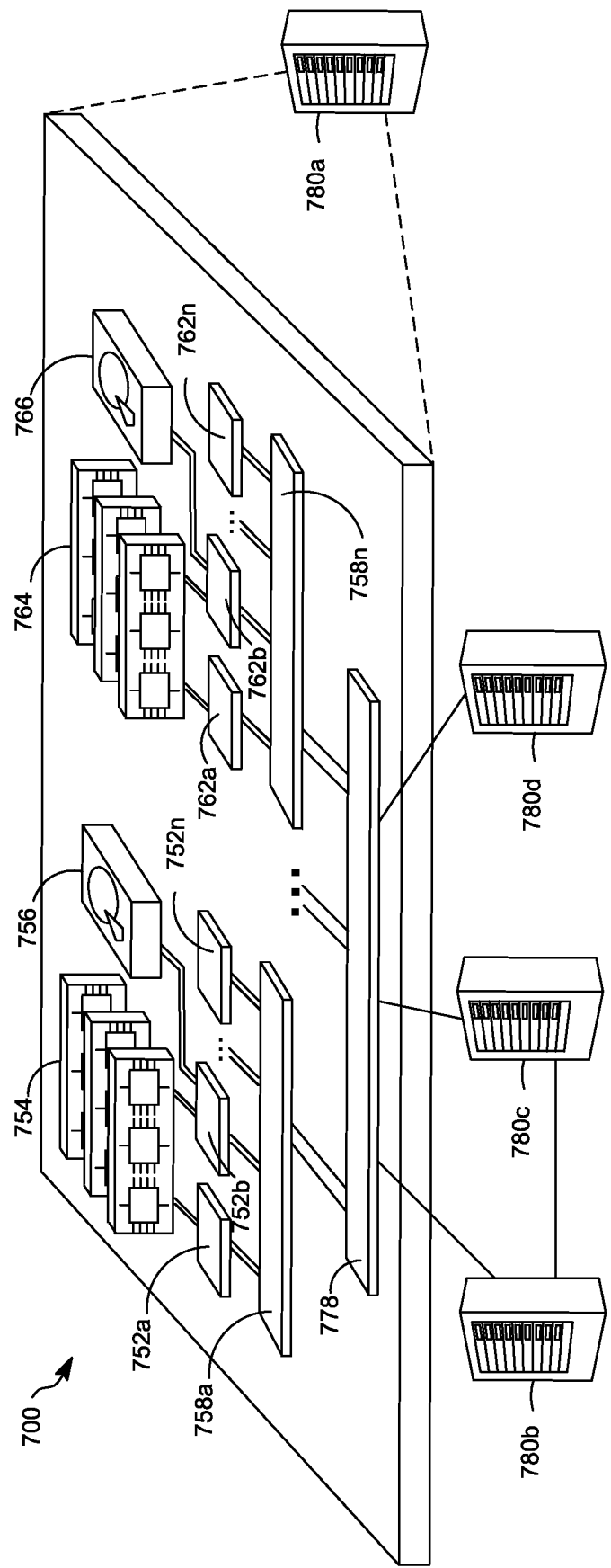
FIG. 7 is a diagram that illustrates an example of a distributed computer device that can be used to implement the described techniques.

FIG. 7 shows an example of a generic computer device 700, which may be search system 120 of FIG. 2, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 70 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 762a-762n, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as environment 100 of FIG. 1, may be made up of multiple computing devices 700 communicating with each other. For example, device 780a may communicate with devices 780b, 780c, and 780d, and these may collectively be known as environment 100. As another example, computer 220 of FIG. 2 may include one or more computing devices 700. Some of the computing devices may be located geographically close to each other, and others may be located geographically distant. The layout of system 700 is an example only and the system may take on other layouts or configurations.

In some implementations, providing, based on the accuracy score, the candidate passage for display includes comparing the accuracy score to an accuracy score threshold; in response to the accuracy score being greater than the accuracy score threshold, displaying the candidate passage on the display; and in response to the accuracy score being less than the accuracy score threshold, not displaying the candidate passage on the display.

In some implementations, scoring the candidate passage using the context passages includes determining a level of consensus between the candidate passage and the set of context passages, the accuracy score being based on the level of consensus.

In some implementations, scoring the candidate passage using the context passages includes inputting the candidate passage and remaining respective passages into a score prediction engine configured to predict the score based on the candidate passage and remaining respective passages.

In some implementations, scoring the candidate passage using the context passages further includes in addition to inputting the candidate passage and remaining respective passages into the score prediction engine, inputting respective titles of the candidate passage and remaining respective passages into the score prediction engine.

In some implementations, the method further comprises performing a training operation on a corpus of training data to train the score prediction engine, the corpus of training data including candidate passages providing short answers for display in callouts and remaining respective passages, from which a top scoring short answer is generated. In such implementations, the corpus of training data further includes the remaining respective passages and the respective titles of the candidate passage and remaining respective passages. In such implementations, performing the training operation includes applying a loss function that is based on a set of accuracy score thresholds applied to a candidate passage, the loss function including, for each of the set of accuracy score thresholds for the primary passage, a sigmoidal cross-entropy loss for that threshold score. In such implementations, the loss function produces as output an average of the sigmoidal cross-entropy loss over the set of accuracy score thresholds. In such implementations, the training operation includes a plurality of training stages, and the set of accuracy score thresholds varies between the plurality of training stages of the training operation. In such implementations, the training operation includes a teacher training operation producing a teacher model, and a student training operation producing a student model, wherein the student training takes as input a set of teacher accuracy scores produced by the teacher model. In such implementations, the teacher training operation is based on a loss function that includes a mean square error on teacher and student models.

In some implementations, the corpus of training data also includes a third set of previously-scored passages, respective accuracy scores of the previously-score passages not being based on a consensus with the candidate passage and remaining respective passages.

In some implementations, providing the candidate passage for display as a short answer includes selecting a top-ranked passage having the highest accuracy score of the predetermined number of top-ranked passages.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving a search query;
   generating a plurality of search results based on the search query, each of the plurality of search results having a respective passage relating to the search query;
   selecting a set of the respective passages,
      one of the respective passages in the set being a candidate passage belonging to a top-ranked search result of the plurality of search results, and
      remaining respective passages in the set being context passages belonging to lower-ranked search results of the plurality of search results;
   scoring the candidate passage using the context passages to produce an accuracy score for the candidate passage, the accuracy score indicating a level of consensus between the candidate passage and the context passages; and
   in response to the accuracy score being greater than a threshold, providing the candidate passage for display as a short answer in a search result page rendered by a browser window on a display.

2. The computer-implemented method as in claim 1, further comprising:
   in response to the accuracy score being less than the accuracy score threshold, not providing the candidate passage for display as the short answer in the search result page.

3. The computer-implemented method as in claim 1, wherein scoring the candidate passage using the context passages includes:
   inputting the candidate passage, the search query, and the context passages into a score prediction engine configured to predict the accuracy score based on the candidate passage, the search query, and the context passages.

4. The computer-implemented method as in claim 3, wherein scoring the candidate passage using the context passages further includes:
   in addition to inputting the candidate passage, the search query, and the context passages into the score prediction engine, inputting respective titles of the candidate passage and the context passages into the score prediction engine.

5. The computer-implemented method as in claim 3, wherein the score prediction engine was trained on a corpus of training records, the corpus of training records including training queries, primary passages selected for the training queries, at least one context passage, and respective accuracy scores for the primary passages.

6. The computer-implemented method as in claim 5, wherein the corpus of training records further includes respective titles of the primary passages for the at least one context passage.

7. The computer-implemented method as in claim 5, wherein the score prediction engine was further trained by applying a loss function that is based on a set of accuracy score thresholds applied to a primary passage, the loss function including, for each of the set of accuracy score thresholds for the primary passage, a sigmoidal cross-entropy loss for that threshold score.

8. The computer-implemented method as in claim 7, wherein the loss function produces as output an average of the sigmoidal cross-entropy loss over the set of accuracy score thresholds.

9. The computer-implemented method as in claim 7, wherein the score prediction engine was trained using a plurality of training stages, and
wherein the set of accuracy score thresholds varies between the plurality of training stages.

10. The computer-implemented method as in claim 5, wherein the corpus of training records also includes a set of previously-scored passages, respective accuracy scores of the previously-scored passages not being based on a consensus with the primary passages and at least one context passages.

11. The computer-implemented method as in claim 1, wherein the set of the respective passages includes a predetermined number of top-ranked passages.

12. The computer-implemented method as in claim 11, wherein providing the candidate passage for display as the short answer includes selecting a top-ranked passage having the highest accuracy score of the predetermined number of top-ranked passages.

13. A computer program product comprising a non-transitory storage medium, the computer program product including code that, when executed by processing circuitry on which a search engine is configured to execute, causes the processing circuitry to perform a method, the method comprising:
receiving query data representing a search query;
generating a plurality of search results based on the search query, each of the plurality of search results having a respective passage relating to the search query;
selecting a set of the respective passages,
one of the respective passages in the set being a candidate passage belonging to a top-ranked search result of the plurality of search results, and
remaining respective passages in the set being context passages belonging to lower-ranked search results of the plurality of search results;
scoring the candidate passage using the context passages to produce an accuracy score for the candidate passage, the accuracy score indicating a level of consensus between the candidate passage and the context passages; and
in response to the accuracy score being greater than a threshold, providing the candidate passage for display as a short answer in a search result page rendered by a browser window on a display.

14. The computer program product as in claim 13, wherein the method further comprises
in response to the accuracy score being less than the accuracy score threshold, not providing the candidate passage for display as the short answer in the search result page.

15. The computer program product as in claim 13, wherein scoring the candidate passage using the context passages includes:
inputting the candidate passage and the context passages into a score prediction engine configured to predict the accuracy score based on the candidate passage and the context passages.

16. The computer program product as in claim 15, wherein scoring the candidate passage using the context passages further includes:
in addition to inputting the candidate passage and the context passages into the score prediction engine, inputting respective titles of the candidate passage and the context passages into the score prediction engine.

17. The computer program product as in claim 15, wherein the method further comprising:
performing a training operation on a corpus of training data to train the score prediction engine, the corpus of training data including candidate passages providing short answers for display and remaining respective passages, from which a top scoring short answer is generated.

18. An apparatus, the apparatus comprising:
memory; and
controlling circuitry coupled to the memory, the controlling circuitry being configured to:
receive query data representing a search query;
generate a plurality of search results based on the search query, each of the plurality of search results having a respective passage relating to the search query;
select a set of the respective passages,
one of the respective passages in the set being a candidate passage belonging to a top-ranked search result of the plurality of search results, and
remaining respective passages in the set being context passages belonging to lower-ranked search results of the plurality of search results;
score the candidate passage using the context passages to produce an accuracy score for the candidate passage, the accuracy score indicating a level of consensus between the candidate passage and the context passages; and
in response to the accuracy score being greater than a threshold, provide the candidate passage for display as a short answer in a search result page rendered by a browser window on a display.

19. The apparatus as in claim 18, wherein the controlling circuitry is further configured to:
in response to the accuracy score being less than the accuracy score threshold, not provide the candidate passage for display as the short answer in the search result page.

20. The apparatus as in claim 18, wherein the apparatus configured to score the candidate passage using the context passages is further configured to:
input the candidate passage, the search query, and the context passages into a score prediction engine configured to predict the accuracy score based on the candidate passage, the search query, and the context passages.

* * * * *